UNITED STATES PATENT OFFICE.

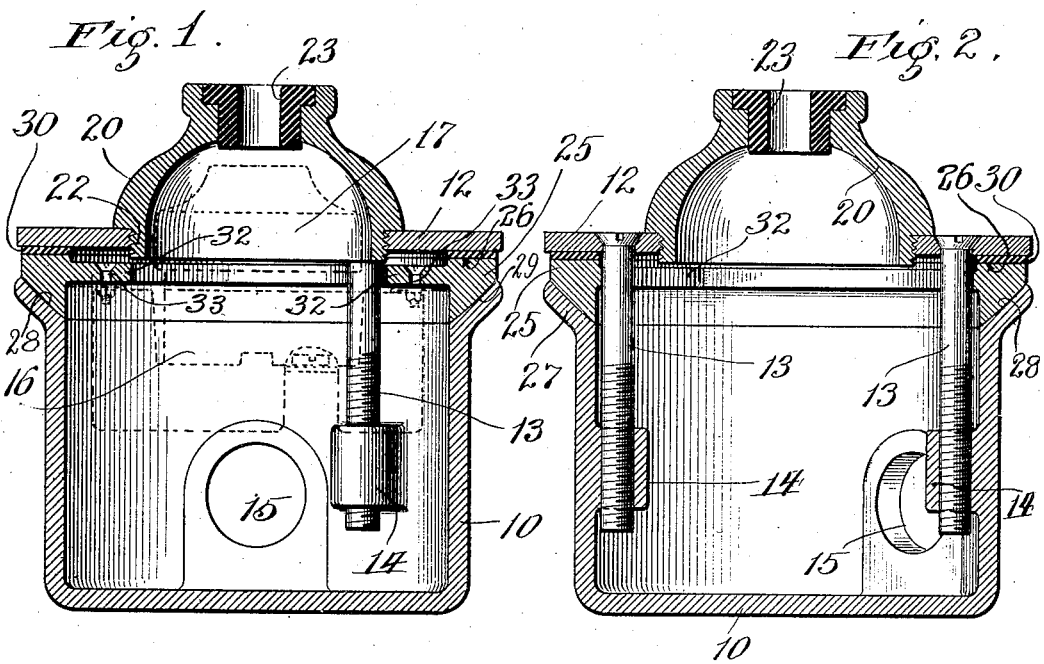
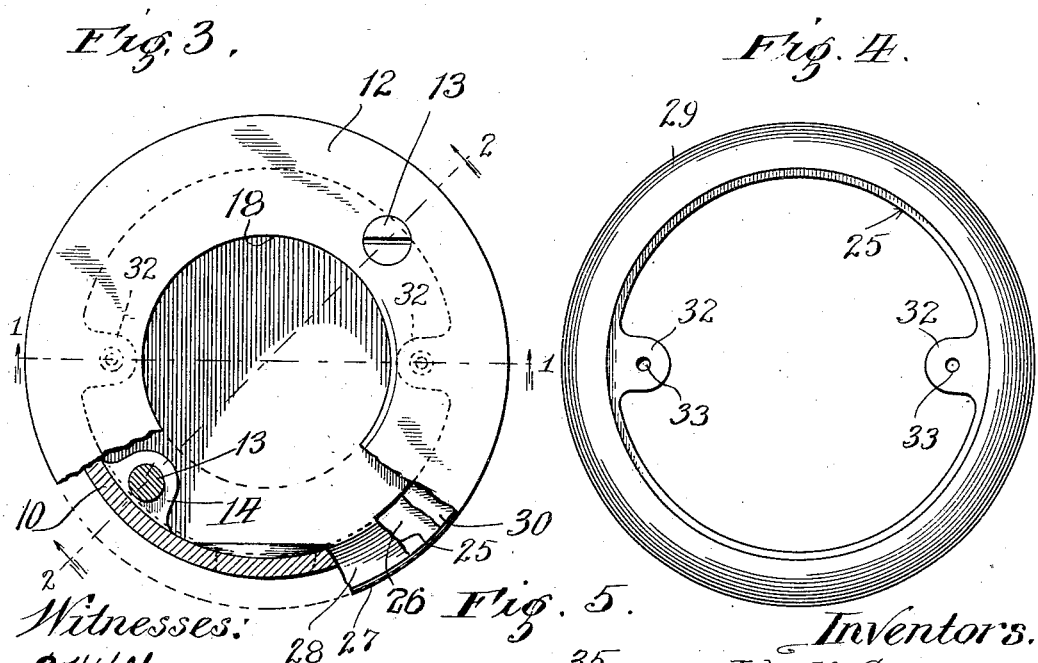

MILLARD E. AMES AND JOHN H. GOEHST, OF CHICAGO, ILLINOIS.

FLOOR-BOX FOR ELECTRIC-CONDUCTOR TERMINALS.

No. 910,261.  Specification of Letters Patent.  Patented Jan. 19, 1909.

Application filed June 8, 1908. Serial No. 437,375.

*To all whom it may concern:*

Be it known that we, MILLARD E. AMES and JOHN H. GOEHST, citizens of the United States, and residents of Chicago, in the county of Cook and State of Illinois, have invented certain new and useful Improvements in Floor-Boxes for Electric-Conductor Terminals; and we do hereby declare that the following is a full, clear, and exact description thereof, reference being had to the accompanying drawings, and to the letters of reference marked thereon, which form a part of this specification.

This invention relates to an improved outlet box for electric conductors for use in office buildings, banks, residences and like places through which conductors are led from conduits in a floor of an apartment to an electric lamp, an electric fan, or other electric device located in the apartment.

The outlet box is designed more particularly as a floor box but may be employed to advantage where electric conductors are to be led from conduits in the ceiling or wall of an apartment.

Among the objects of the invention is to provide an outlet box of this character, the cover of which may be accurately fitted to the finished or final surface of the floor or of a wall in which the box is located, so as to avoid the necessity of accurately fitting the box body in the floor or wall structure when first installed therein.

A further object of the invention is to provide an improved construction in a box of this character whereby the box is readily accessible to permit the insertion or removal of the plug or the repair or removal of the parts of the socket or plug contained in the box.

In the drawings:—Figure 1 is a vertical axial section of an outlet box made in accordance with my invention, showing in dotted lines a familiar form of socket base and plug. Fig. 2 is a vertical axial section of the box, taken in another plane. Fig. 3 is a top plan view of the box, partially broken away, with the detachable outlet cap removed. Fig. 4 is a bottom plan view of an adjusting ring forming part of the adjustable cover of the box. Fig. 5 is an end elevation of a screw-threaded plug for closing the opening in the cover of the box when the usual outlet cap is not in use.

As shown in the drawings, 10 designates the body of an integral metal outlet box which is closed at its sides and bottom and is open at its top.

12 designates the cover thereof which is shown as attached to the box body by means of screw bolts 13, 13 which extend downwardly through openings in the cover and have screw-threaded engagement with lugs 14, 14 formed integral with and extending inwardly from the vertical wall of the box body. The heads of said bolts have countersunk engagement with the cover so as to lie flush with the outer face of the cover. The box body is provided with one or more openings 15, 15 through which electric conductors are carried to the box, where they are connected with any suitable form of socket base 16 supported within the box and indicated in dotted lines in Fig. 1. Said openings 15, 15 are formed in thickened portions of the vertical wall of the box body and in practice are adapted to receive the ends of conduits containing the conductors. In some instances two conduits may enter the box through the openings 15, preferably from the opposite sides of the box body, whereby a plurality of conductors may be carried into the box, one or more of which may be carried directly through the box to other outlet boxes.

17 designates a plug of any preferred form which is removably connected with the socket base 16 and extends through a central opening 18 of the cover partially beyond said cover. When this form of socket base and socket are employed, the cover is provided with a hollow outlet cap 20 which is detachably fitted to the cover and incloses said plug. The said outlet cap is herein shown as provided with a reduced screw-threaded portion 22 which enters the opening 18 of the cover and has screw-threaded engagement therewith. Said cap is provided at its upper end with an opening which is lined with an insulating bushing 23 outwardly through which the conductors pass from the plug 17.

The body of the outlet box is usually installed in the floor structure or other support at the time the conduits which carry the electric conductors are placed in position and said work is ordinarily done before the floor proper is laid. In the floor construction of modern fire-proof buildings a concrete filling is placed over the iron girders and the tile supported between the same, and on which the floor proper is laid, and the conductor conduits and the body of the outlet box are laid or embedded in such filling. It is practically impossible to locate the body of the box so accurately at the time of its installation that the cover 12 of the box will be flush with the finished face of the floor or wall. It will be found in practice that a cover fitted to the box body without adjustment will almost invariably either be located below the level of the floor or will be inclined at an angle to the plane of the finished face of the floor. In order to overcome these objections I have provided a cover which is so constructed and fitted to the box body as to permit a universal adjustment thereof relatively to the plane of the finished floor and to be adjusted towards and from the box body, and thus enable the cover to be accureately leveled with the floor and to be brought accurately flush with the surface of the floor, notwithstanding the fact that the body of the box may be placed at too low or high a level in the floor structure or that it may not be properly leveled. The construction by which these objections are overcome is made as follows: Interposed between the cover proper 12 and the body of the box at the upper open side thereof is an adjusting ring 25. This ring 25 is provided with a flat upper surface 26 on which the cover 12 is supported. The upper marginal portion of the wall of the box is provided with an annular outwardly and upwardly flaring rim 27, the upper face of which constitutes a seat on which is fitted the adjusting ring 25. The contact faces of the ring and seat are transversely curved on arcs of circles of the same radius, giving them the form of annular, spherical segments, whereby the said ring and the cover supported thereon are capable of universal adjustment with respect to the box body to enable the cover and ring to be tilted in any direction desired so as to bring the upper or outer face of the cover parallel with the outer face of the finished floor, or other part in which the box is mounted. The said adjusting ring is clamped in place between the flaring rim of the box and the cover by the attaching bolts 13 which attaches the cover to the box.

In order that the cover may be brought accurately to the level of the finished floor a filling ring or gasket 30 is interposed between the upper face 26 of the adjusting ring and said cover. Such filling ring will be made of a thickness required to bring the top of the cover to the floor level or more than one ring may be used for that purpose.

Said filling ring 30 will ordinarily be made of some suitable yielding material, as a specially treated fiber, so that the ring or rings may be slightly compressed under the action of the attaching screw bolts 13 to provide a water-tight joint between the cover and the box body.

When fitting the box to the unfinished structure or foundation of a floor extreme care need not be exercised to level the box with respect to the final plane of the floor or to mount the box so that the cover when placed thereon will be accurately flush with the floor; care only being taken that the box be placed sufficiently below the final floor level so that the cover and adjusting ring when placed in position thereon will not bring the cover above the floor level. After the floor is laid and finished the ring or rings 30 are placed between the cover 12 and the adjusting ring 25 to bring the upper face of the cover approximately flush with the upper face of the floor. If it be found that the upper face of the cover is not parallel with the plane of the upper face of the floor, the cover and adjusting ring may be tilted slightly on the seat so as to bring said upper face of the cover accurately in the plane of the upper face of the floor. After the parts have been thus adjusted, the cover is fixed in place by tightening the screwbolts 13.

It will be manifest that the cover 12 and the adjusting ring 25 constitute, in effect, a two-part cover which is fastened in place by the screw-bolts 13 and is fitted to the box body so that the cover, as a whole, may be twisted or tilted slightly on its seat to bring the upper face of the cover accurately in the plane of the upper face of the finished floor, and that the making of the cover of two parts and providing the filling rings 30 to space the same enables the upper member of the cover to be adjusted vertically with respect to the lower member or ring 25 so as to bring said upper member flush with the finished floor. Thus it will be observed that we have provided a universal adjustment of the cover with respect to the box body which enables said cover to be accurately fitted to the door or other support regardless of inaccuracies of fitting the box in the floor or other structure.

The socket base is herein shown as attached to the adjusting ring 25 of the cover, said adjusting ring being for this purpose provided with inwardly extending apertured lugs 32 through which extend fastening bolts 33 that are attached to the socket base in any suitable manner.

When the box is not in use and the plug and socket base are removed therefrom, the opening in the cover 12 may be closed by a screw-threaded plug 35 which is made of a size to fit substantially flush with the cover so as to present substantially no projection from the face of the floor or other part in which the box is mounted.

We claim as our invention:—

1. An outlet for electric conductors comprising a box body provided at its upper margin with an annular outwardly and upwardly flaring, integral rim having an inwardly and upwardly facing, concave, annular bearing surface, a detachable cover for said box, an adjusting ring interposed between the cover and box body and provided with a downwardly and outwardly facing, annular, transversely curved bearing surface engaging the complemental bearing surface on said rim of the body, and means for securing the said ring and cover to the body.

2. An outlet for electric conductors comprising a box body provided at its upper margin with an annular outwardly and upwardly flaring, integral rim having an inwardly and upwardly facing, concave, annular bearing surface, a detachable cover for said box body, an adjusting ring interposed between the cover and body and provided with a downwardly and outwardly facing, annular, transversely curved bearing surface engaging the complemental surface on the said rim of the body, and a plurality of bolts engaged with the body at their lower ends through the medium of which said adjusting ring and cover are secured to the body.

3. An outlet for electric conductors comprising a box body, a cover therefor having an opening for the passage of a conductor, an adjusting ring interposed between the cover and body and provided with an annular transversely curved bearing surface engaging a complemental bearing surface on the box body, and screws extending through said cover and having screw-threaded engagement with the box body.

4. An outlet for electric conductors comprising a box body provided at its open end with a flaring annular rim, a cover provided with an opening for the passage of the conductor, an adjusting ring interposed between the cover and rim, said adjusting ring being formed with a transversely curved surface adapted to seat against a complemental surface on the rim, and means for fastening the cover to the box body, arranged to clamp said ring against said rim.

In testimony, that we claim the foregoing as our invention we affix our signatures in the presence of two witnesses, this 25th day of May A. D. 1908.

MILLARD E. AMES.
JOHN H. GOEHST.

Witnesses:
WILLIAM L. HALL,
GEORGE R. WILKINS.